UNITED STATES PATENT OFFICE.

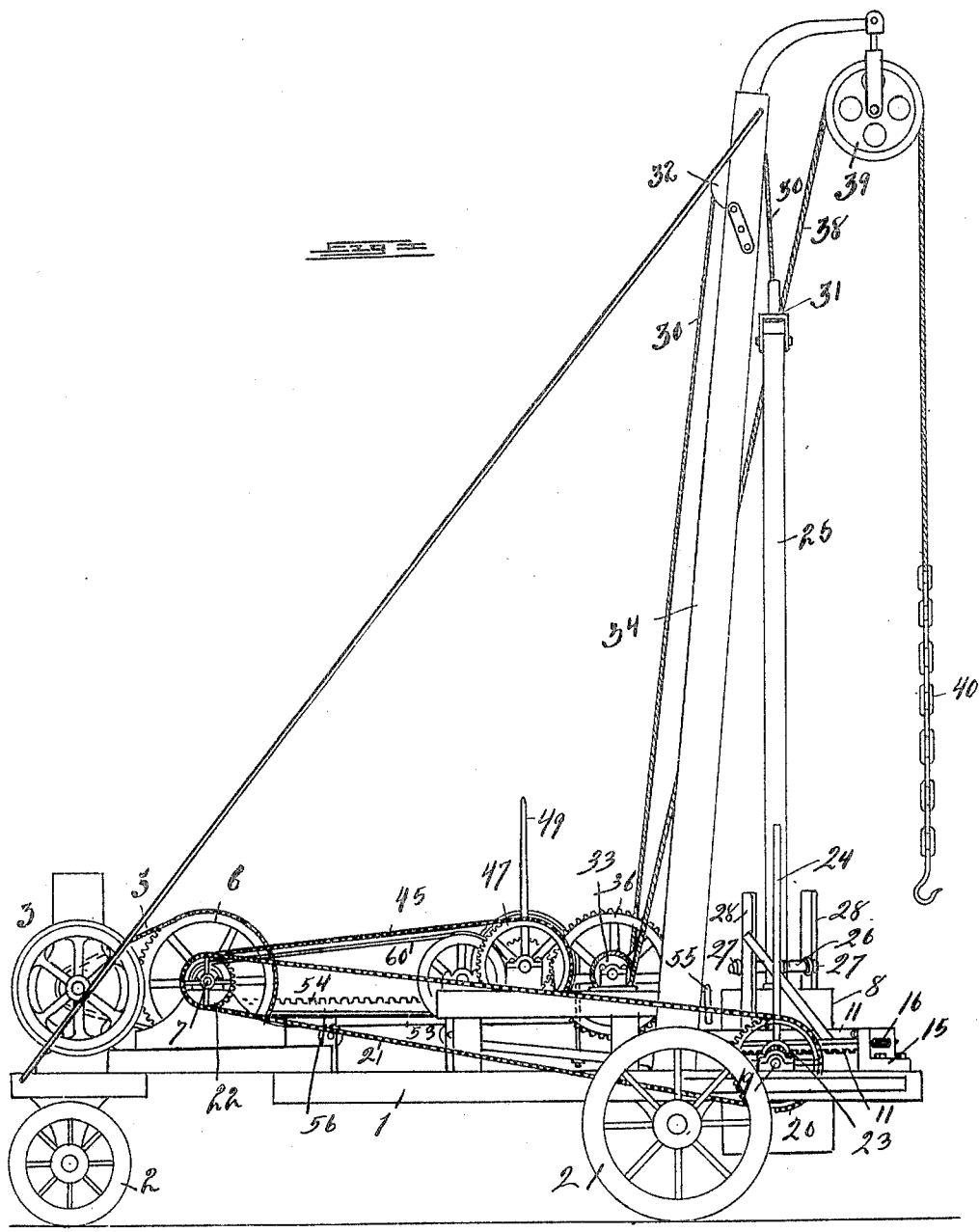

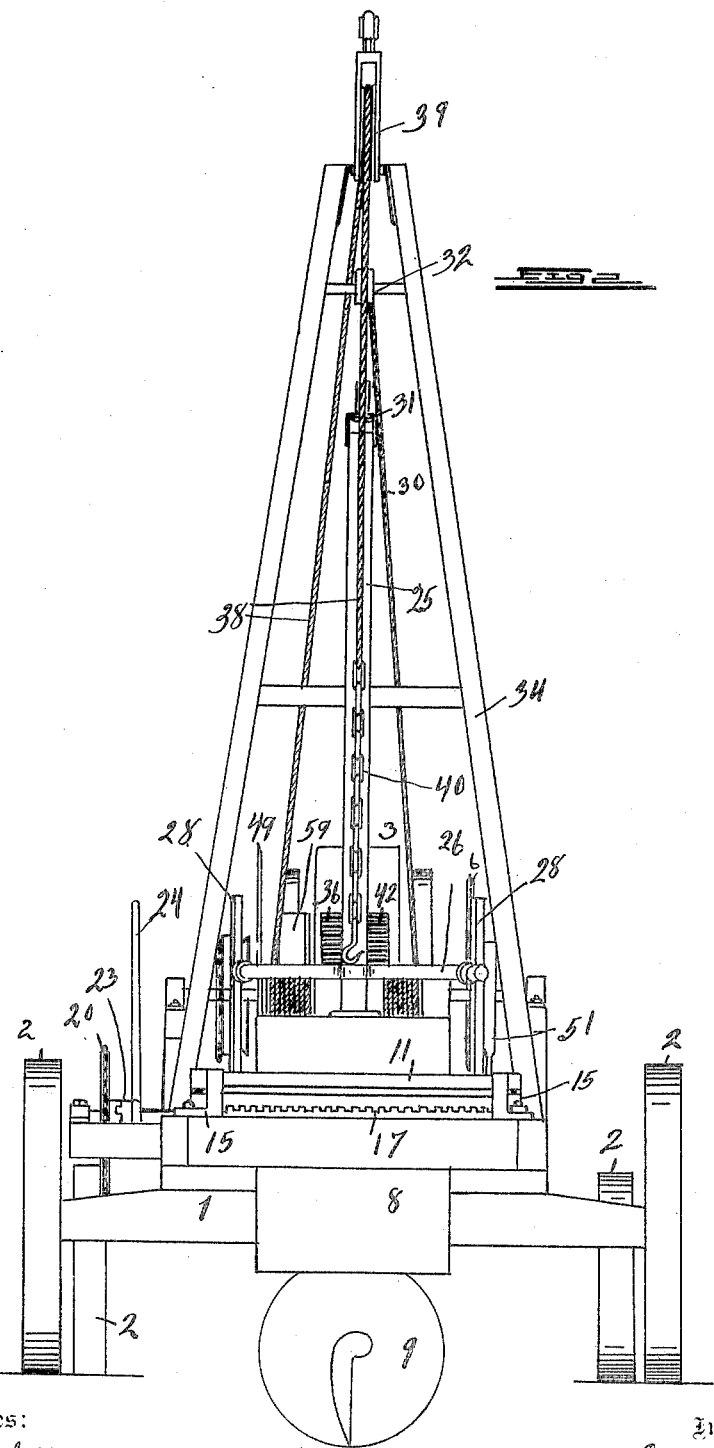

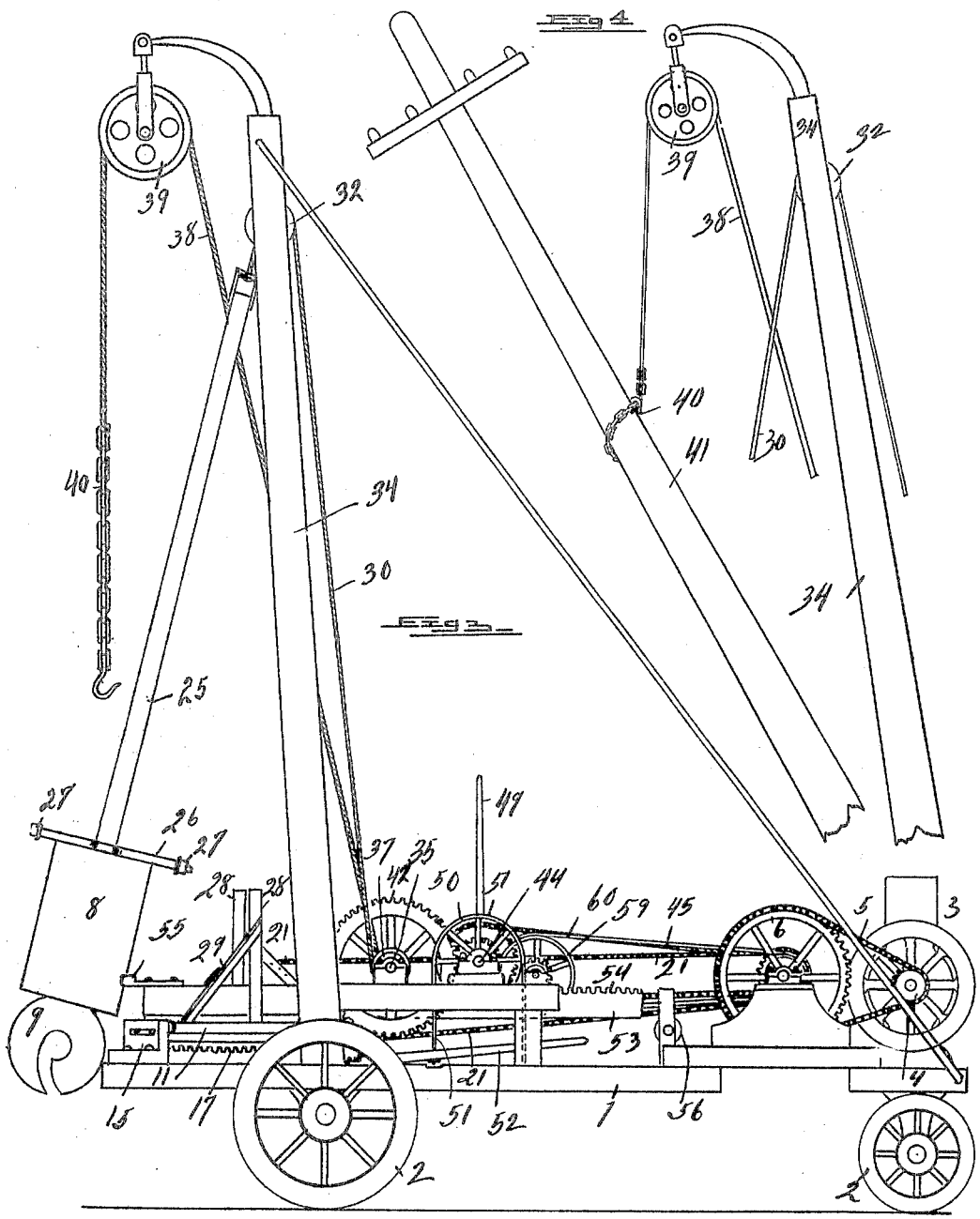

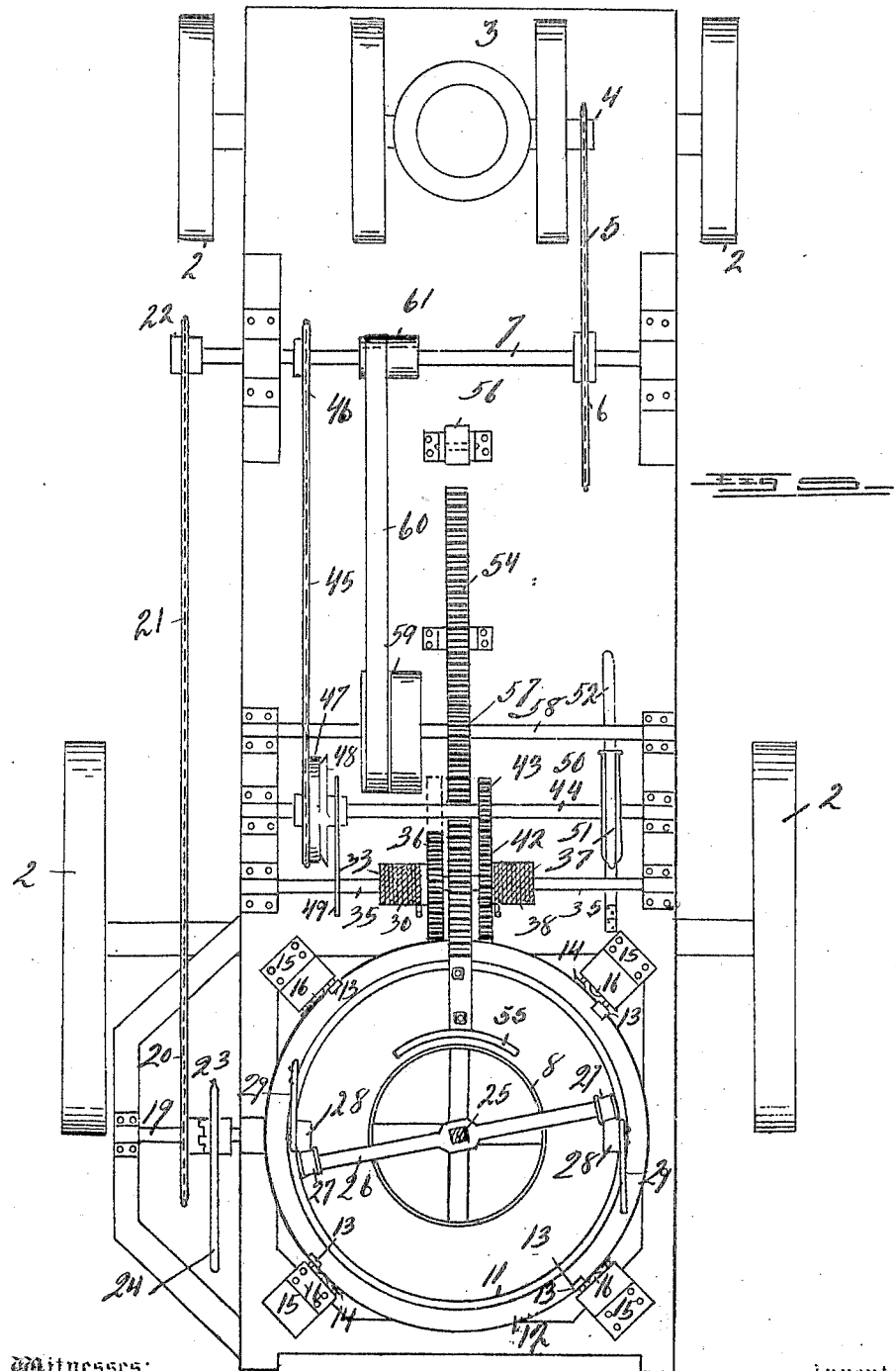

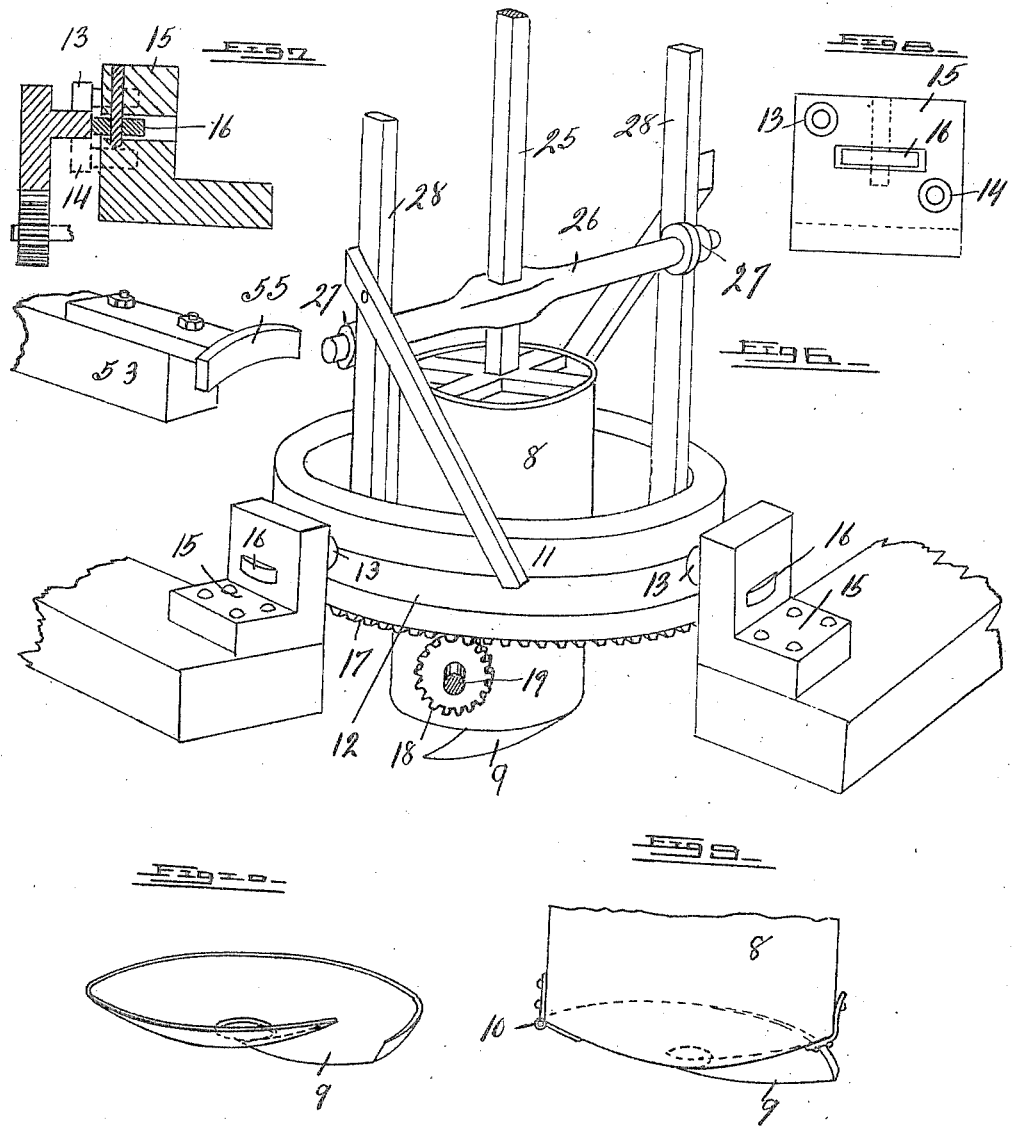

ERNEST G. EDDY AND GEORGE R. EDDY, OF LANSING, MICHIGAN.

POST-HOLE-BORING AND POLE-SETTING MACHINE.

No. 804,458.  Specification of Letters Patent.  Patented Nov. 14, 1905.

Application filed August 3, 1903. Serial No. 167,983.

*To all whom it may concern:*

Be it known that we, ERNEST G. EDDY and GEORGE R. EDDY, citizens of the United States, residing at No. 319 East Main street, Lansing, in the county of Ingham, State of Michigan, have invented certain new and useful Improvements in Post-Hole-Boring and Pole-Setting Machines; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a machine for boring post-holes and setting posts, being more expressly designed for use in connection with the erection of telegraph and telephone poles and posts upon which are strung electric conductors and cables for railway and other purposes, the invention consisting in the construction and arrangement of parts hereinafter fully set forth, and pointed out particularly in the claims.

The object of the invention is to provide a machine of the character described which shall be portable and wherein the arrangement is such as to readily provide for boring the hole, raising and dumping the auger, and setting the post in position, all of which said operations being under the control of the operator.

The above object is attained by the mechanism illustrated in the accompanying drawings, in which—

Figure 1 is a side elevation of a machine involving our invention. Fig. 2 is a rear end elevation thereof. Fig. 3 is a side elevation of the machine, showing the position of parts when dumping the auger. Fig. 4 is a fragmentary view in elevation, showing the manner of swinging the post into position for setting. Fig. 5 is a plan view with the derrick removed. Fig. 6 is a fragmentary view in perspective, showing the mechanism for operating the auger and the reciprocatory ram which carries the auger to the rear of the machine for dumping. Fig. 7 is an enlarged detail section through one of the roller-bearings which support the ring that drives the auger, said ring appearing in transverse section. Fig. 8 is an elevation of one of said bearings. Fig. 9 is an elevation of the lower end of the auger. Fig. 10 is a perspective view of the bottom or bit of the auger, which is hinged to the auger shell or bucket.

Referring to the characters of reference, 1 designates a suitable frame mounted upon transporting-wheels 2 and carrying an engine or motor 3, preferably of the gasolene type. From a sprocket-wheel 4 upon the engine-shaft leads a sprocket-chain 5 to a sprocket-wheel 6 on the main transverse shaft 7, whereby said shaft is driven so that power may be taken therefrom to operate the several parts of the machine, as hereinafter stated.

The auger with which the holes are dug comprises a bucket or cylindrical shell 8, having a bottom 9, which is hinged at 10 to the bucket and is formed into a suitable bit for boring. The auger is driven through the medium of the rotary ring 11, having a lateral flange 12, which is supported between the antifriction-rollers 13 and 14, mounted in suitable blocks 15, supported by the frame, the perimeter of said flange running in peripheral contact with the antifriction-rollers 16, seated in said blocks, whereby said ring is held securely in place and guided in its rotary movement. Upon the under side of the ring 11 are the gear-teeth 17, which mesh with a pinion 18 upon the shaft 19, suitably journaled in the frame. Mounted to run loosely upon said shaft is a sprocket-wheel 20, which is driven by a chain 21 from a wheel 22 on the projecting end of shaft 7. To provide for driving the shaft 19, a jaw-clutch 23 is employed of the ordinary type, adapted to be actuated by the lever 24, whereby through the operation of said clutch the shaft 19 may be started and stopped at will. The auger is driven through the medium of a square shaft 25, which passes through a square opening in the cross-arm 26, having upon its outer ends the antifriction-rollers 27, adapted to engage the opposite faces of the uprights 28, secured to the ring 11, said uprights being securely braced, as shown at 29. It will now be understood that when the ring 11 is rotated the uprights 28 will engage the antifriction-rollers on the cross-arm 26, thereby causing said arm to turn therewith and rotate the auger 8 through the medium of the shaft which passes through said arm. As the auger descends in its work the cross-arm rides downwardly upon the uprights 28, thereby relieving the parts from undue friction.

The auger is fed downwardly by gravity and is raised by means of a cable 30, which is attached, by means of a swivel 31, to the upper end of the shaft of the auger and passes over a sheave 32, the end of said cable being secured to a drum 33, upon which it is adapted to wind. The sheave 32 is supported by a suitable derrick 34, which is mounted upon the frame. The drum 33 is mounted upon a counter-shaft 35 and is provided with a gear-wheel 36. Also mounted upon the shaft 35 is a drum 37, upon which the cable 38, which passes over the large sheave 39, is adapted to wind, said cable having a chain 40 on the end thereof to enable it to be attached to a pole 41, as shown in Fig. 4. The drum 37 is also provided with a gear-wheel 42, and each of said gears is adapted to be driven by a pinion 43, which is splined upon the shaft 44 and may be moved (by any suitable means) upon said shaft to engage either of the pinions 36 and 42. The shaft 44 is driven through the medium of a sprocket-chain 45, leading from a wheel 46, upon the shaft 7, to a loose wheel 47 upon the shaft 44, which is made to drive said shaft by means of a friction-clutch 48, operated through the lever 49, whereby the shaft 44 may be rotated to revolve either of the drums 33 and 37. Upon the shaft 44 is a brake-wheel 50, adapted to be controlled by a band-brake 51, attached to a pivoted lever 52, whereby the rotation of either of the drums may be controlled when lowering the auger or when setting a pole.

When the bucket of the auger becomes filled, it is necessary to raise the auger and dump it. To enable the auger to be swung away from the hole when being dumped, a ram 53 is employed, carrying a rack 54, adapted to engage the bucket of the auger. Said ram is mounted to reciprocate upon suitable rollers 56 and is driven longitudinally to cause the saddle to engage the bucket of the auger and swing it rearward of the frame, as shown in Fig. 3, by means of a pinion 57, mounted upon the shaft 58, which is provided with a tight and loose pulley 59, upon which runs a belt 60 from the pulley 61 on the shaft 7. By shifting the belt upon the pulley (by any suitable means) the pinion 57 will drive back the rack and force the saddle against the bucket of the auger to carry said bucket rearwardly, when it may be dumped by disengaging the catch of the hinged bottom. After the bucket of the auger has been emptied and the hinged bottom swung back into place its weight will carry the ram back to the normal position, when the belt 60 is shifted to the loose pulley. When the bucket is raised for the purpose of dumping, it is drawn upwardly, so as to swing free from the ring 11, and after it has been returned it is lowered into working position within the ring and the cross-arm caused to engage the uprights 28.

After the hole has been dug the chain 40 is wrapped around the pole and said pole hoisted into position by means of the cable 38, the pole being steadied by said cable in its upright position until earth can be filled in around it.

By means of this improved device a hole may be quickly and perfectly dug and a post readily set therein, and because of the portability of the machine it may be easily moved from place to place, thereby greatly facilitating the work.

Having thus fully set forth our invention, what we claim as new, and desire to secure by Letters Patent, is—

1. In a machine for the purpose set forth, the combination with a portable frame, of a motor mounted thereon, a rotary auger mounted to swing pendulum-like, a rotary ring for driving said auger, means connected with said motor for driving said ring, means detachably connecting said ring with said auger, and means connected with and operated by said motor for swinging the auger laterally.

2. In a machine for the purpose set forth, the combination with a suitable frame, of a motor carried thereon, a rotary and vertically-movable auger mounted in the frame to swing laterally, a rotary ring for driving said auger detachably connected thereto, means for rotating said ring, means for moving the auger vertically, a longitudinally-reciprocatory ram detachably engaging said auger for moving the auger laterally, said ring and auger actuating means being connected to and operated by said motor.

3. In a machine for the purpose set forth, the combination with a portable frame and motor mounted on said frame, of a rotary ring, means connected with said motor for driving said ring, a vertically and laterally movable auger mounted centrally within said ring, said auger being detachably attached to the ring to cause it to rotate therewith, means operated by the motor for raising the auger and means also operated by said motor for moving the auger laterally.

4. In a machine for the purpose set forth, the combination with a suitable frame, of a motor mounted thereon, an auger adapted to rotate and move vertically, means connected with the motor for rotating the auger and imparting vertical movement thereto, a longitudinally-movable ram adapted to engage the auger to swing it rearwardly for dumping, and means connected with the motor for actuating said ram.

In testimony whereof we sign this specification in the presence of two witnesses.

ERNEST G. EDDY.
GEORGE R. EDDY.

Witnesses:
Wm. C. Hinman,
Homer A. Collar.